United States Patent
Mahaffy

(10) Patent No.: US 8,075,037 B2
(45) Date of Patent: Dec. 13, 2011

(54) VEHICLE REAR END ASSEMBLIES WITH STORAGE ASSEMBLIES

(75) Inventor: Jennifer J. Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 114 days.

(21) Appl. No.: 12/568,797

(22) Filed: Sep. 29, 2009

(65) Prior Publication Data

US 2011/0074175 A1     Mar. 31, 2011

(51) Int. Cl.
    *B60R 9/06* (2006.01)
(52) U.S. Cl. .................. 296/37.6; 296/24.4; 296/24.44; 296/57.1
(58) Field of Classification Search ................. 296/37.6, 296/24.32, 24.4, 24.44, 26.1, 26.11, 57.1; 224/402–404
    See application file for complete search history.

(56) References Cited

U.S. PATENT DOCUMENTS

| | | | |
|---|---|---|---|
| 3,202,455 A | 8/1965 | Grotz | |
| 4,005,898 A | 2/1977 | Way | |
| 4,236,461 A * | 12/1980 | Barksdale | 108/44 |
| 4,266,821 A * | 5/1981 | Gillet | 296/37.6 |
| 4,962,709 A | 10/1990 | Huber | |
| 5,154,470 A * | 10/1992 | Bringman, Jr. | 296/26.11 |
| 5,328,225 A * | 7/1994 | Melching et al. | 296/26.11 |
| 5,340,183 A * | 8/1994 | Horian | 296/24.4 |
| 5,364,154 A | 11/1994 | Kaiser | |
| 5,427,033 A | 6/1995 | Bly | |
| 5,468,037 A * | 11/1995 | Peterson et al. | 296/57.1 |
| 5,498,049 A * | 3/1996 | Schlachter | 296/37.6 |
| 5,649,734 A * | 7/1997 | Speis | 296/57.1 |
| 5,743,589 A * | 4/1998 | Felker | 296/180.5 |
| 5,853,116 A * | 12/1998 | Schreiner | 224/404 |
| 6,050,202 A | 4/2000 | Thompson | |
| 6,053,553 A * | 4/2000 | Hespelt | 296/37.1 |
| 6,062,146 A | 5/2000 | Conners et al. | |
| 6,092,708 A | 7/2000 | Rand | |
| 6,145,447 A | 11/2000 | Henderson | |
| 6,550,836 B2 * | 4/2003 | Rigau | 296/37.6 |
| 6,561,560 B2 * | 5/2003 | Brown et al. | 296/26.11 |
| 6,641,190 B2 * | 11/2003 | Kirchhoff | 296/26.11 |
| 6,905,157 B2 * | 6/2005 | Kang et al. | 296/55 |
| 6,942,269 B2 | 9/2005 | Mains | |
| 7,111,884 B2 * | 9/2006 | Johnson | 296/26.1 |
| 7,111,887 B2 * | 9/2006 | Cooley | 296/37.6 |
| 7,488,021 B1 * | 2/2009 | Roos et al. | 296/26.11 |
| 7,566,085 B2 * | 7/2009 | Jaskolski | 296/57.1 |
| 7,665,790 B2 * | 2/2010 | Oino | 296/37.16 |
| 7,874,610 B2 * | 1/2011 | Khalighi | 296/180.1 |
| 2004/0113449 A1 * | 6/2004 | Hunt | 296/57.1 |
| 2011/0074175 A1 * | 3/2011 | Mahaffy | 296/37.6 |

* cited by examiner

*Primary Examiner* — Glenn Dayoan
*Assistant Examiner* — Gregory Blankenship
(74) *Attorney, Agent, or Firm* — Dinsmore & Shohl LLP

(57) ABSTRACT

A vehicle storage assembly of a vehicle includes a deployable and retractable shelf member connected to a tailgate of the vehicle. In a deployed configuration, the shelf member is supported spaced-above the tailgate to provide a horizontal support surface with the tailgate in an open position and the shelf member is supported spaced horizontally from the tailgate to provide a sidewall of a storage compartment with the tailgate in a closed position.

16 Claims, 9 Drawing Sheets

VEHICLE REAR END ASSEMBLIES WITH STORAGE ASSEMBLIES

TECHNICAL FIELD

The present specification generally relates to vehicle rear end assemblies and, more particularly, to vehicle rear end assemblies for providing storage.

BACKGROUND

Load carrying vehicles, such as trucks, often have fold-down tailgates. Folded down, the tailgates extend the area of the truck bed. Folded up, the tailgates close off the truck bed. Tailgates, in some instances, can as such be used as an additional horizontal support surface when folded down for items. For example, when a truck is stationary, the folded down tailgate can be used as a support for food items or a beverage or provide a place to sit. However, it would be desirable to provide additional, multi-functional support surfaces in connection with tailgates.

SUMMARY

In one embodiment, a vehicle rear end assembly includes a tailgate having a folded-down open position for providing access to a rear storage space of a vehicle through an access opening and a folded-up closed position for closing the access opening. A storage assembly is connected to the tailgate. The storage assembly includes a shelf member that, in a deployed configuration, is supported vertically above the tailgate with the tailgate in an open position.

In another embodiment, a vehicle storage assembly of a vehicle includes a deployable and retractable shelf member connected to a tailgate of the vehicle. In a deployed configuration, the shelf member is supported spaced-above the tailgate to provide a horizontal support surface with the tailgate in an open position and the shelf member is supported spaced horizontally from the tailgate to provide a sidewall of a storage compartment with the tailgate in a closed position.

In another embodiment, a vehicle includes a rear storage space and a tailgate providing access to the rear storage space. The tailgate has an open position and a closed position. A storage assembly is connected to the tailgate. The storage assembly includes a shelf member that, in a deployed configuration, is supported vertically above the tailgate with the tailgate in the open position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
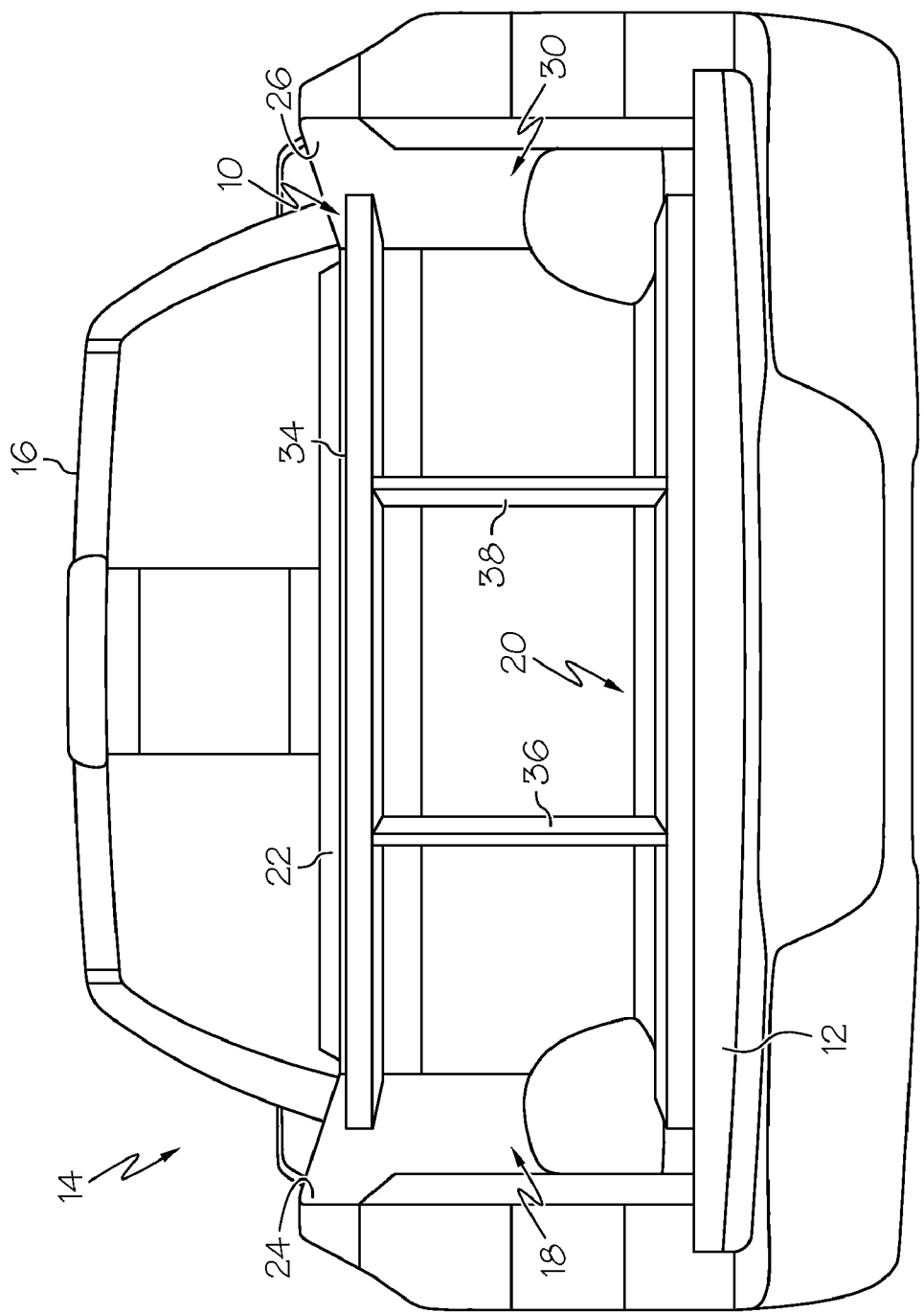
FIG. 1 is a rear view of a vehicle illustrating a storage assembly in a deployed configuration connected to a tailgate in an open position according to one or more embodiments shown and described herein.

Embodiments described herein relate to vehicle rear end assemblies, which generally provide increased storage and/or containment for loose items. The vehicle rear end assemblies may include one or more multi-functional storage assemblies that, in a closed tailgate configuration, partition storage space within a bed of the vehicle by providing individual containment areas and, in an open tailgate configuration, provide vertical shelving for placement of loose items. Various embodiments of the vehicle rear end assemblies and the operation of the rear end assemblies will be described in more detail herein.

Vehicle tailgates may include an inner wall and an outer wall made of sheet metal and/or plastic material. In the case of a pick-up truck with a drop-down tailgate, the tailgates may have an upright position in which the inner wall forms part of the enclosure of the pick-up bed where the inner wall and outer wall may enclose a tailgate space within the tailgate. In some tailgates, this pick-up bed space may be left empty. The tailgates may also have a drop down position where the inner wall and the outer wall drop toward the ground to provide additional access to the pick-up bed. In tailgates described herein, the tailgates may include storage assemblies that, in a closed tailgate configuration, partition storage space within a bed of the vehicle by providing individual containment areas and, in an open tailgate configuration, provide vertical shelving for placement of loose items. The storage assemblies may also be stowed away, for example, against the tailgate such that they may be deployed when desired.

Referring to FIGS. 1-4 an exemplary embodiment of a storage assembly 10 is shown that may be connected to a tailgate 12 of, for example, a truck 14. The truck 14 generally includes a cab 16 at a front of the truck and a pick-up bed 18 located at a rear of the truck 14. The cab 16 may be an enclosed space where the driver can sit. The pick-up bed 18 provides a volume 20 in which objects can be stored and transported. The pick-up bed 18 may be formed of a forward wall 22 and sidewalls 24 and 26 that extend rearward from the forward wall 22. The tailgate 12 may be provided having a closed configuration, which closes off an access opening 30 between the sidewalls 24 and 26 at the rear of the truck 14 and an open configuration as shown, where the tailgate 12 is folded-down (e.g., at a hinge) to provide access to the volume 20 through the access opening 30.

The storage assembly 10 may be connected to the tailgate 12 thereby moving with the tailgate 12 between the open and closed configurations of the tailgate 12. The storage assembly 10 has a deployed configuration (FIG. 1) providing vertically supported shelving 32 with the tailgate 12 in the open configuration and a retracted configuration (FIG. 4) where the storage assembly 10 is retracted toward the tailgate 12.

Figure 2:
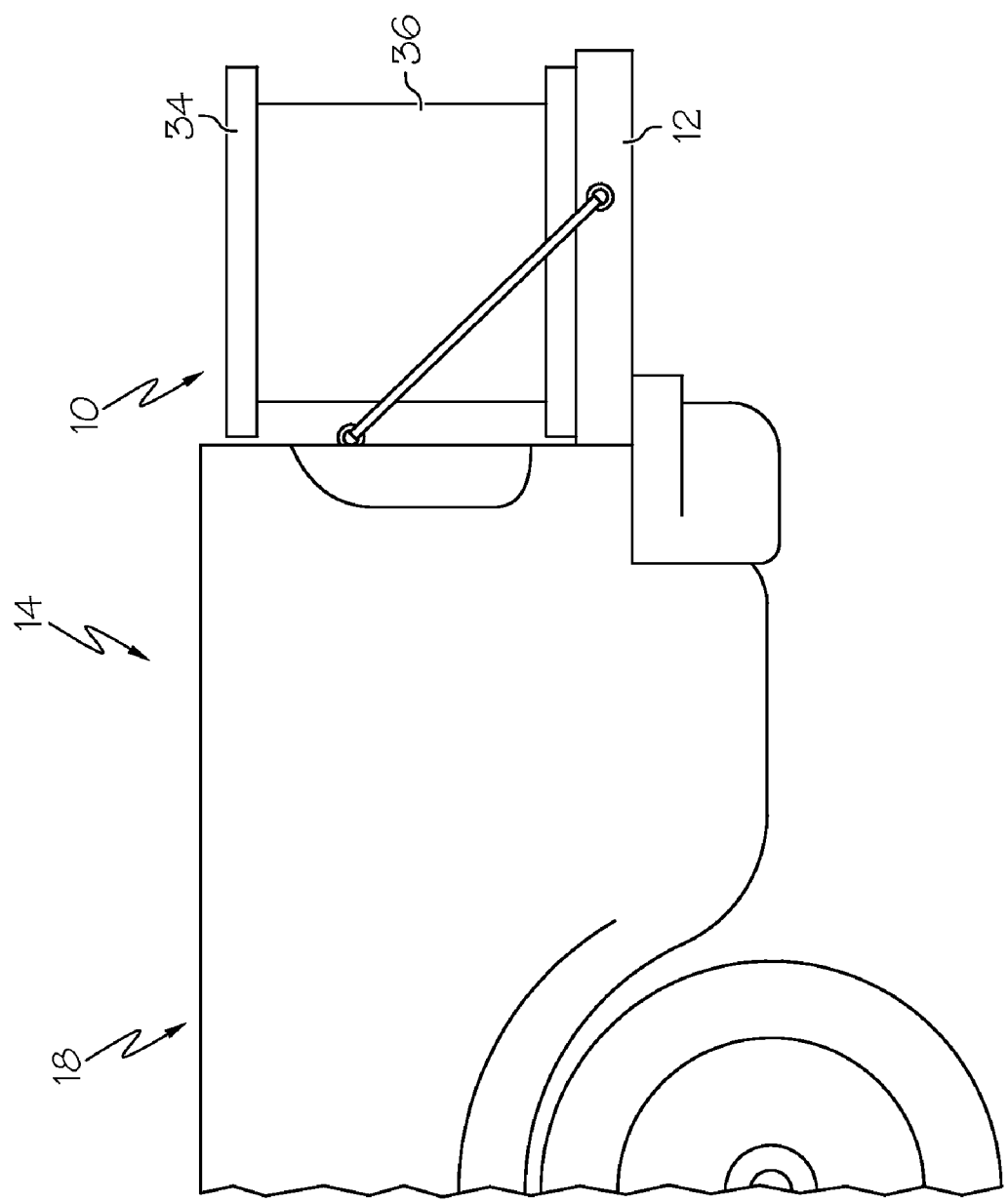
FIG. 2 is a side view of a rear portion of the vehicle of FIG. 1 according to one or more embodiments shown and described herein.

Referring particularly to FIGS. 1 and 2, the exemplary embodiment of the storage assembly 10 includes a shelf member 34 that is vertically supported above and overhanging the tailgate 12. Vertical support members 36 and 38 extend vertically from the tailgate 12 upwardly to the shelf member 34 thereby supporting the shelf member 34 in the illustrated deployed configuration. Referring to FIG. 2, the storage assembly 10 may be connected to the tailgate 12 such that the storage assembly 10 is located outside the pick-up bed 18 in the deployed configuration with the tailgate 12 in the open configuration. In another embodiment, at least a portion of the storage assembly 10 may be located inside the pick up bed 18 with the tailgate 12 in the open position.

The shelf member 34 may be somewhat planar in shape, formed of a substantially flat piece of material, such as plastic, metal, wood, glass, etc. Likewise, the vertical support members 36 and 38 may be somewhat planar in shape, formed of a substantially flat piece of material, such as plastic, metal, wood, glass, etc. In some embodiments, in the deployed configuration, the shelf member 34 may be oriented substantially perpendicular to the vertical support members 36 and 38. However, other angles α are possible in the deployed configuration. Additionally, while the shelf member 34 and/or the vertical support members 36 and 38 are illustrated as somewhat rectangular in shape, they may be any other suitable shape. For example, the shelf member 34 may be rounded, such as an oval in shape. The vertical members 36 and 38 may include designs, openings, etc.

Figure 3:
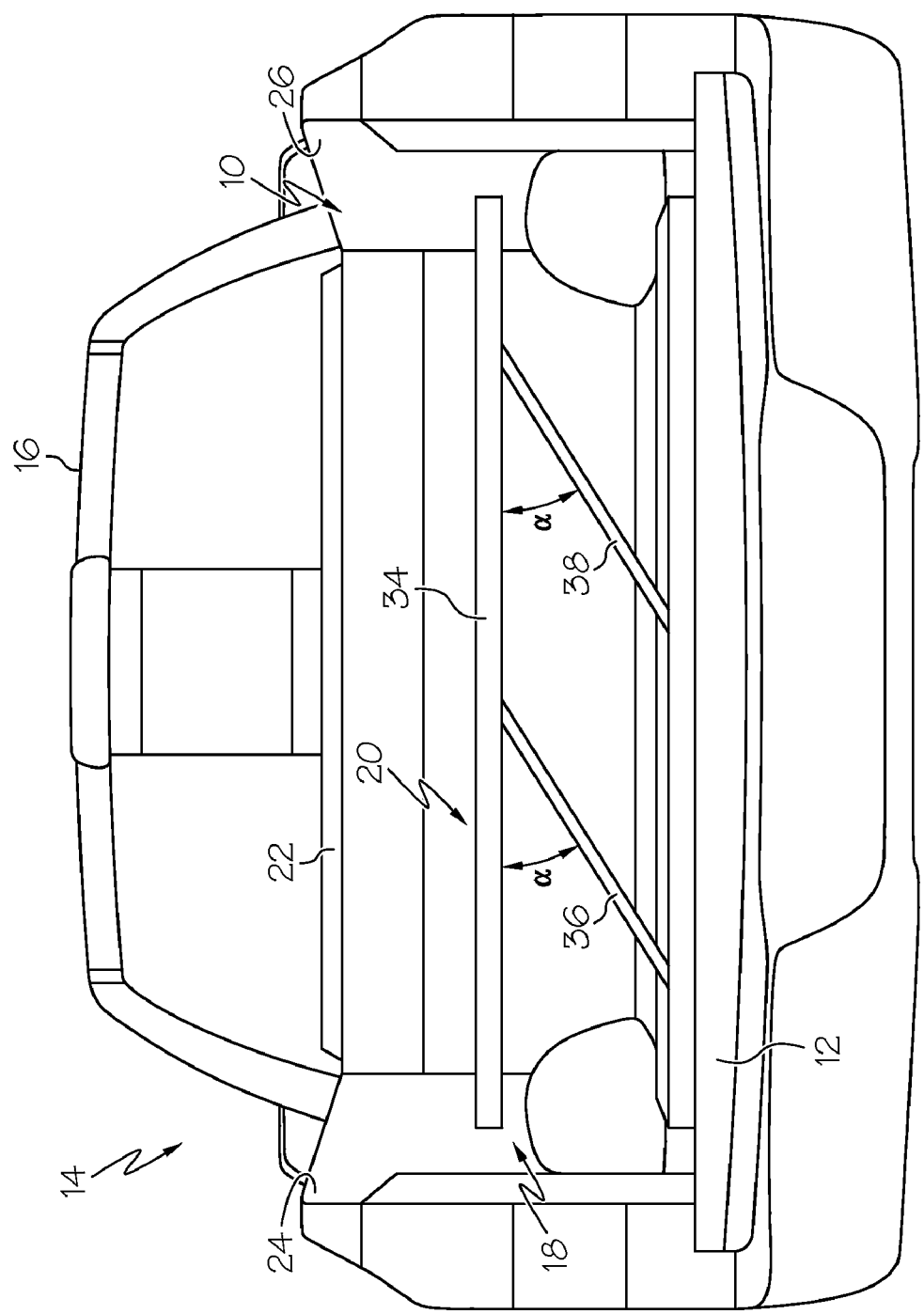
FIG. 3 is a rear view of the vehicle of FIG. 1 with the storage assembly in an intermediate configuration according to one or more embodiments shown and described herein.
Figure 4:
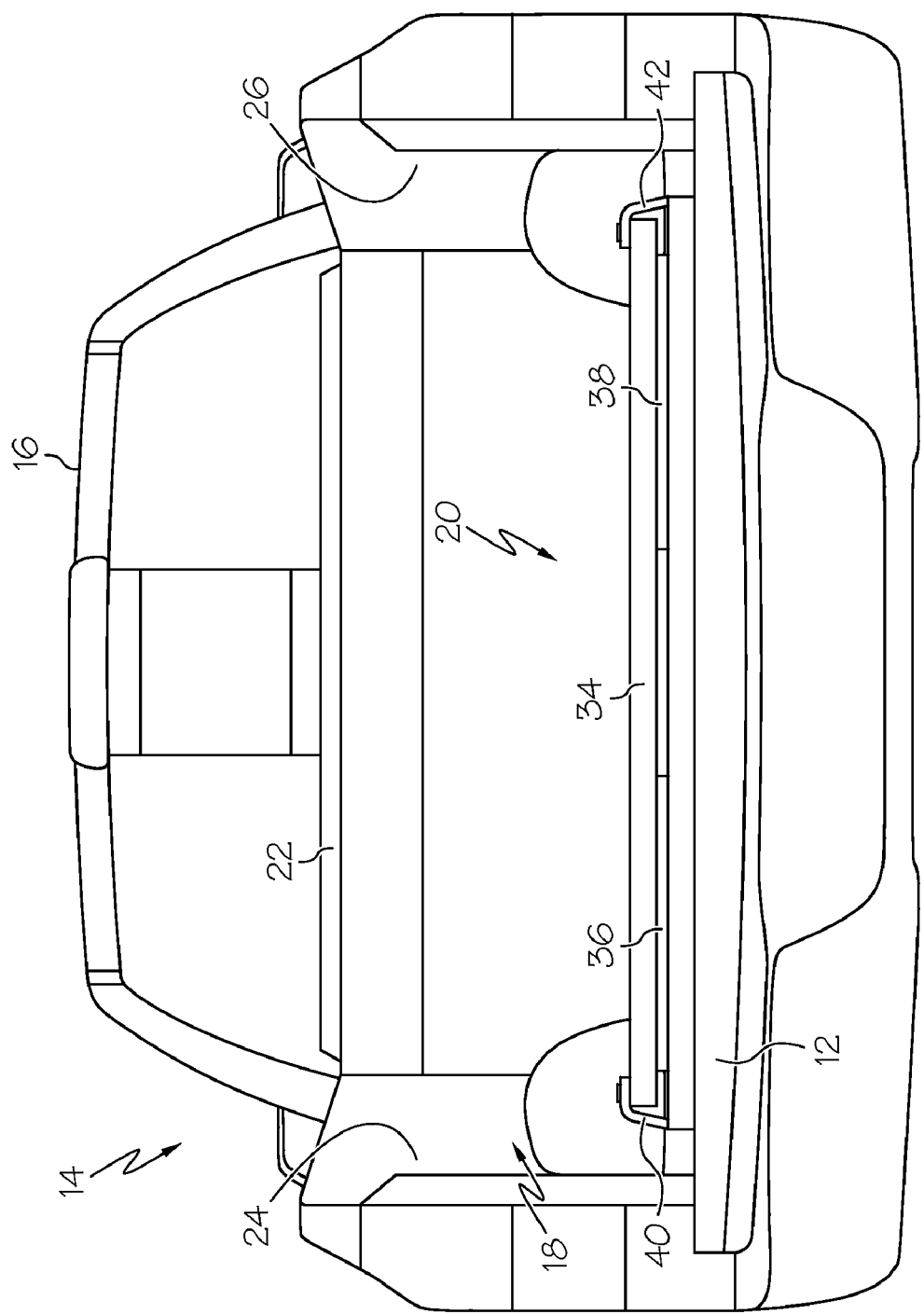
FIG. 4 is a rear view of the vehicle of FIG. 1 with the storage assembly in a retracted configuration according to one or more embodiments shown and described herein.

Referring now to FIGS. 3 and 4, the storage assembly 10 may be retractable toward the tailgate 12 with the tailgate 12 in the open configuration. FIG. 3 illustrates the storage assembly 10 in an intermediate position with the shelf member 34 retracted toward the tailgate 12. In this intermediate position, the vertical support members 36 and 38 may collapse toward the tailgate 12 with the angle α decreasing as the shelf member 34 moves toward the tailgate 12. FIG. 4 illustrates the storage assembly 10 in the retracted configuration with the shelf member 34 fully retracted toward the tailgate 12. In the illustrated exemplary embodiment, the vertical support members 36 and 38 are both folded down such that the vertical support members 36 and 38 lie horizontally between the tailgate 12 and the shelf member 34.

In some embodiments, the storage assembly 10 may include restraining members 40 and 42 that are used to restrain the storage assembly 10 in the retracted configuration. The restraining members 40 and 42 may be, for example, straps that connect (e.g., button, buckle, etc.) to the shelf member 34 to keep the shelf member 34 stowed against the tailgate 12. Other restraining mechanisms are possible, one or more of which will be described in greater detail below.

Figure 5:
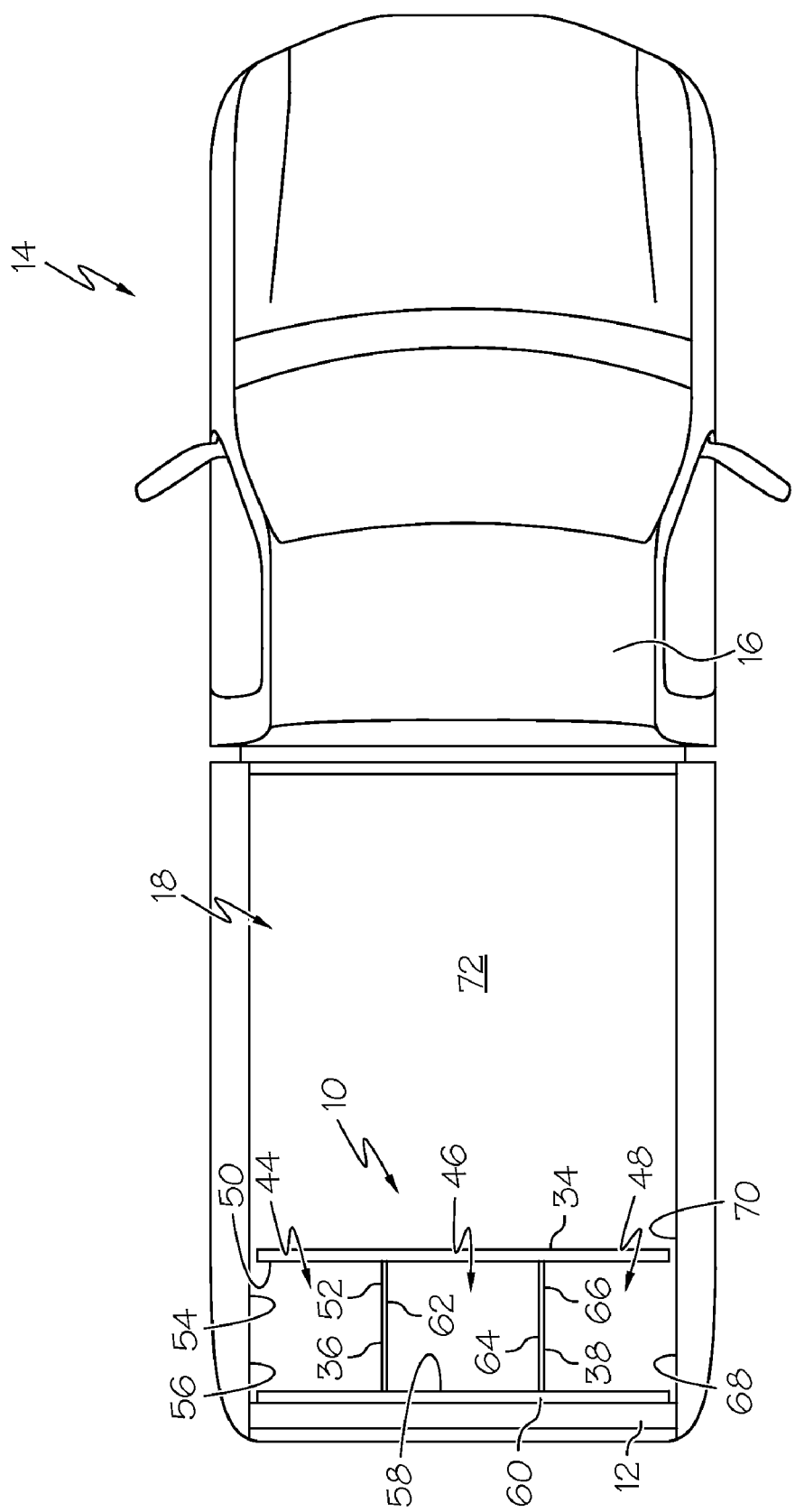
FIG. 5 is a top view of the vehicle of FIG. 1 with the tailgate in a closed position and the storage assembly in the deployed configuration according to one or more embodiments shown and described herein.

Referring to FIG. 5, the storage assembly 10 may convert from a shelving system that provides a vertically supported shelf member 34 to a partitioning system where the shelf member 34 forms a compartment wall disposed vertically within the pick-up bed 18. In the exemplary embodiment of FIG. 5, the tailgate 12 is in its closed position, closing the access opening 30 to the pick-up bed 18. The storage assembly 10 includes the shelf member 34 that is now horizontally supported spaced-apart from the tailgate 12. The support members 36 and 38 extend horizontally along a length of the pick-up bed 18 from the tailgate 12 to the shelf member 34 thereby supporting the shelf member 34 in the illustrated deployed configuration. The storage assembly 10 may be connected to the tailgate 12 such that the storage assembly 10 is located within the pick-up bed 18 in the deployed configuration with the tailgate 12 in the closed configuration. In another embodiment, at least a portion of the storage assembly 10 may be located outside (e.g., above) the pick up bed 18 with the tailgate 12 in the closed position.

With the tailgate 12 in the closed position and the storage assembly 10 in the deployed configuration, the storage assembly 10 provides compartments 44, 46 and 48, each capable of holding or containing one or more items in the pick-up bed 18. Compartment 44 may be formed between a rearward-facing wall 50 of the shelf member 34, a side-facing wall 52 of the support member 36, a side-facing wall 54 of an interior panel 56 of the pick-up bed 18 and a front-facing wall 58 of an interior panel 60 of the tailgate 12. Compartment 46 may be formed between the rearward-facing wall 50 of the shelf member 34, a side-facing wall 62 of the support member 36, a side-facing wall 64 of the support member 38 and the front-facing wall 58 of the interior panel 60 of the tailgate 12. Compartment 48 may be formed between the rearward-facing wall 50 of the shelf member 34, a side-facing wall 66 of the support member 38, a side-facing wall 68 of an interior panel 70 of the pick-up bed 18 and the front-facing wall 58 of the interior panel 60 of the tailgate 12. As can be seen, the compartments 44, 46 and 48 are separated from a remaining area 72 of the pick-up bed 18 outside the storage assembly 10.

Figure 6:
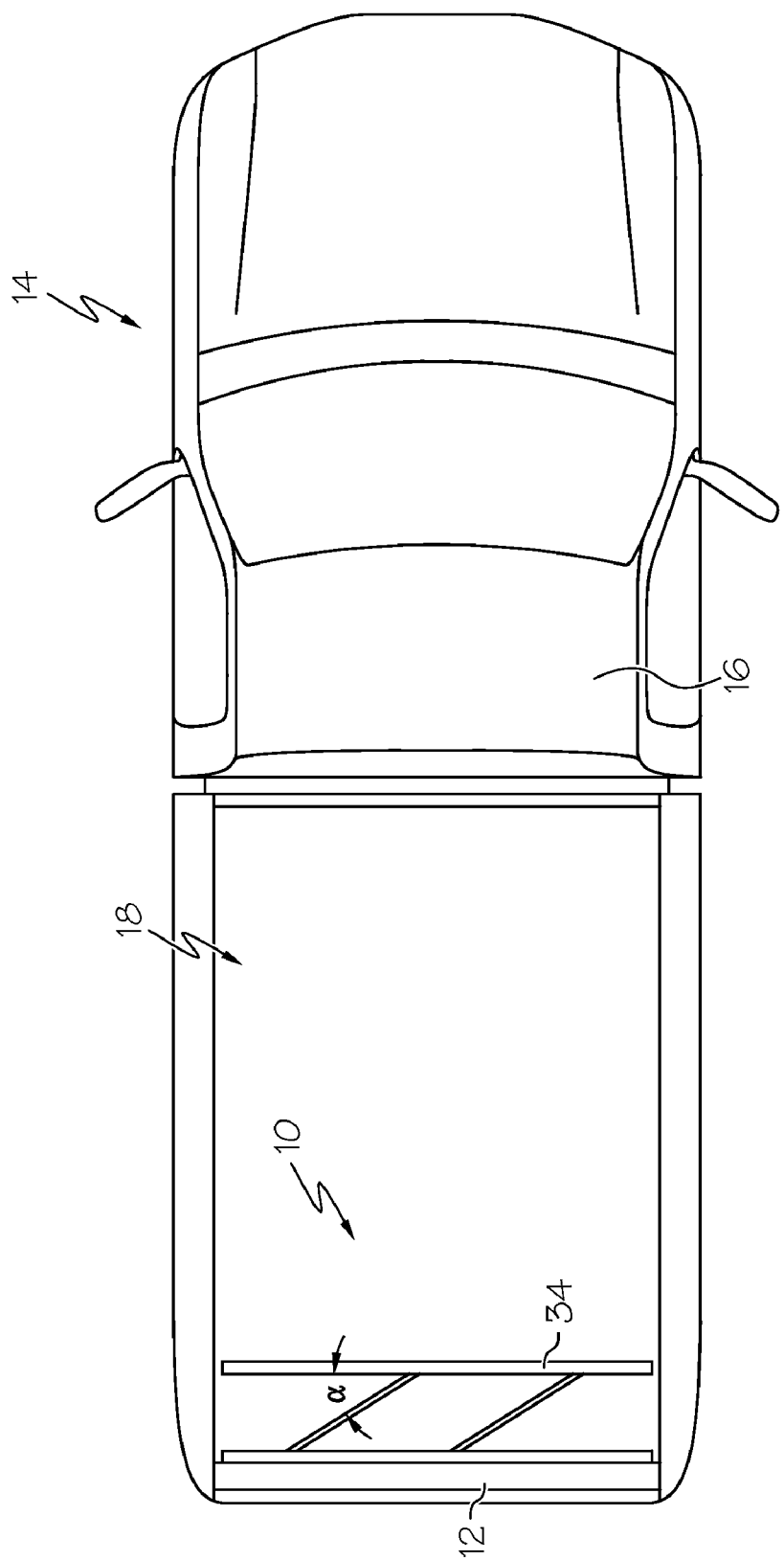
FIG. 6 is a top view of the vehicle of FIG. 5 with the storage assembly in the intermediate configuration according to one or more embodiments shown and described herein.
Figure 7:
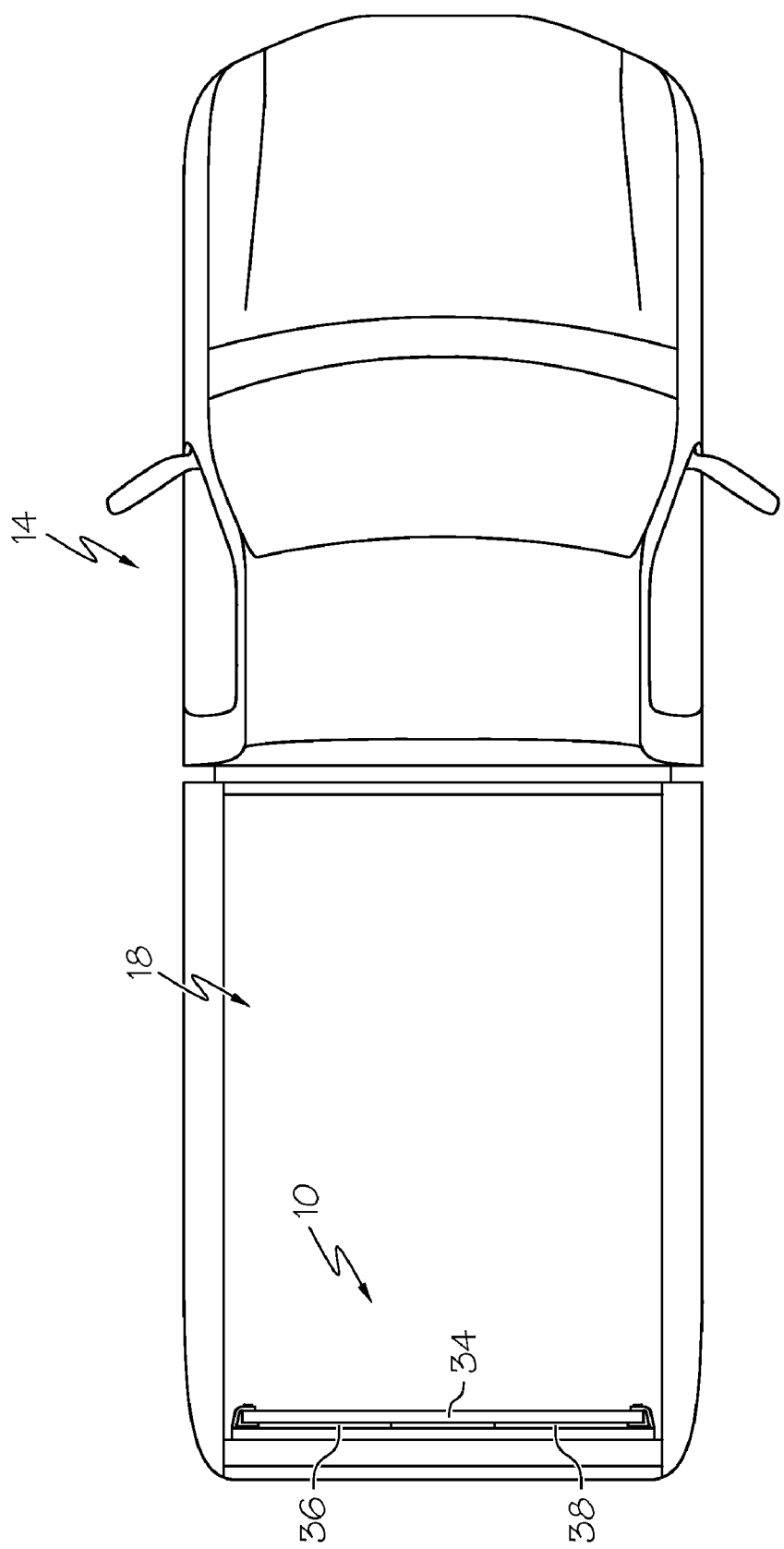
FIG. 7 is a top view of the vehicle of FIG. 5 with the storage assembly in the retracted configuration according to one or more embodiments shown and described herein.

Referring now to FIGS. 6 and 7, the storage assembly 10 may be retractable toward the tailgate 12 with the tailgate 12 in the closed configuration. FIG. 6 illustrates the storage assembly 10 in an intermediate position with the shelf member 34 retracted horizontally toward the tailgate 12. In this intermediate position, the vertical support members 36 and 38 may collapse toward the tailgate 12 with the angle α decreasing as the shelf member 34 moves toward the tailgate 12. FIG. 7 illustrates the storage assembly 10 in the retracted configuration with the shelf member 34 fully retracted toward the tailgate 12. In the illustrated exemplary embodiment, the vertical support members 36 and 38 are both folded horizontally such that the support members 36 and 38 lie vertically between the tailgate 12 and the shelf member 34.

In some embodiments, as shown in FIGS. 1-7, opposite sides 74 and 76 of the storage assembly 10 are open thereby forming open containment spaces through the storage assembly 10. For example, referring to FIG. 5, the compartments 44, 46 and/or 48 may be open on the bottom such that a floor 80 of the pick-up bed 18 forms the bottom of the compartments 44, 46 and/or 48. In other embodiments, the storage assembly 10 may be at least partially closed on one or both of the opposite sides 74 and 76. For example, the storage assembly 10 may include a net or other material used to close the sides 74 and/or 76. In another embodiment, a pouch or tarp may be used to drape over the storage assembly 10, for example, to inhibit items from being removed from the storage assembly 10. In some embodiments, such retaining structures may be removable from the storage assembly 10.

Figure 8:
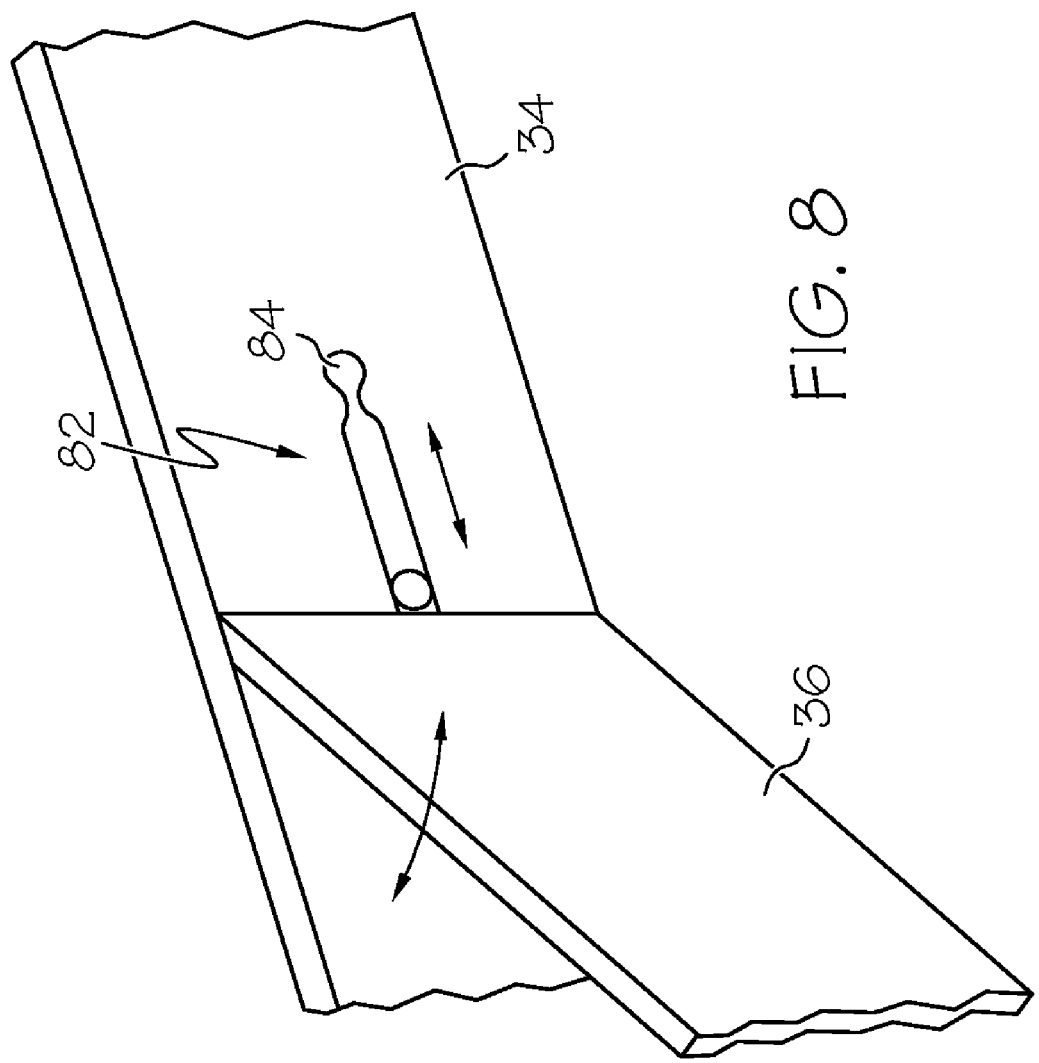
FIG. 8 illustrates a connection between a shelf member and a support member of the storage assembly of FIG. 5 according to one or more embodiments shown and described herein.

Referring to FIG. 8, the support members 36 and 38 may include track assemblies (only track assembly 82 can be seen by FIG. 8) that allow the support members 36 and 38 to move relative to the shelf member 34 and/or the tailgate 12. In some embodiments, both the tailgate 12 and the shelf member 34 include track assemblies 82 that allow the support members 36 and 38 to both move relative to the tailgate 12 and the shelf member 34. The track assemblies 82 may include a locking feature 84 that allow the support members 36 and 38 to releasably lock in the deployed configuration as shown by FIGS. 1 and 5. Hinges or other collapsible features may also be used.

Figure 9:
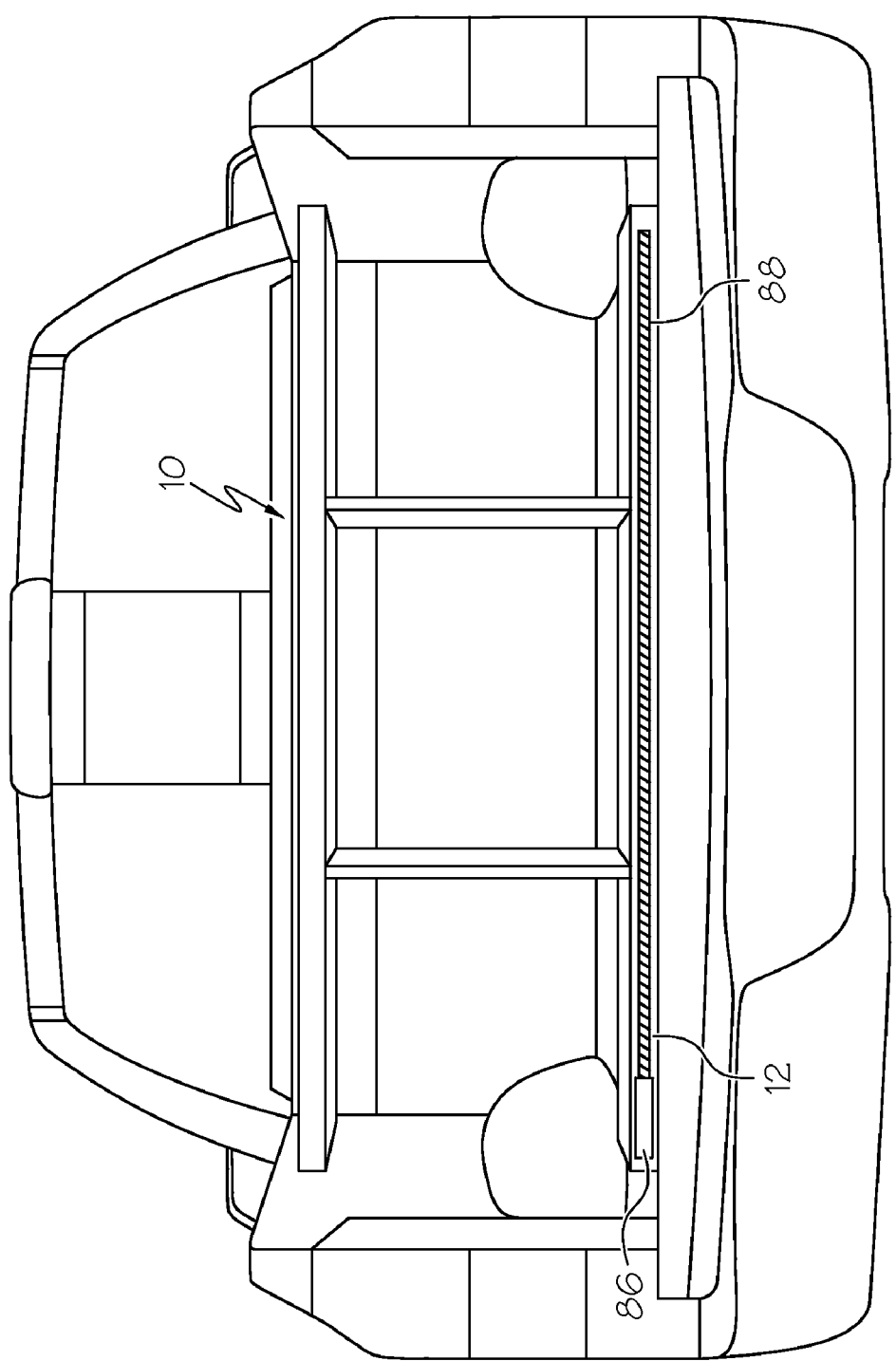
FIG. 9 illustrates another embodiment of a vehicle illustrating a storage assembly in a deployed configuration connected to a tailgate in an open position according to one or more embodiments shown and described herein.

In some embodiments, the storage assembly 10 may be deployed and retracted manually with the tailgate 12 open and/or closed. In another embodiment, as represented by FIG. 9, the storage assembly 10 may be actuator-driven, for example, using a motor 86 and a drive screw 88. A remote keyless entry device or other control, for example, located in the cab 16 may be used to deploy and/or retract the storage assembly 10. In some embodiments, the tailgate 12, itself, may be motor-driven and may be placed in the closed and open positions using one or more motors or other actuators such as pneumatic or hydraulic cylinders.

A controller in the cab of the vehicle may transmit control signals to the actuator-driven storage assembly 10 and/or tailgate 12, allowing them to be deployed by a vehicle operator. For example, the controller may send a signals to the tailgate which cause the tailgate to unlock, to swing down through rotation of a cable drum, and the storage system 10 to deploy. The tailgate 12 and/or storage assembly 10 may be driven by a servomotor, or other motor configuration. One or more motors can be used. A hand crank or other manually operated drive mechanism can be used in place of a motor to move the storage assembly 10 between the retracted and deployed positions. In other examples, the storage assembly may be controlled by operator controls on or proximate to the tailgate. These may include switches, buttons, and the like, which can only be conveniently operated when the vehicle is stopped. A proximity sensor and/or a motion sensor, such as a radar, IR, visual, ultrasound, or other sensor, may be used to prevent deployment of the tailgate and/or the storage assembly if other objects would be at risk of contact by deployment.

The storage assembly 10 may include one or more mechanical locks to prevent motion (either deployment or retraction to the stowed position) of the storage assembly. Locks may be provided by pins, bolts, screws, and the like. No motor activity may be allowed when the vehicle is in motion, or if a sensor (such as a pressure sensor or proximity sensor) detects an object on, proximate to, or secured to the tailgate extender.

Remote control may also be provided. For example, a RKE (Remote Keyless Entry) transmitter system could be used to energize the motor so as to deploy the storage assembly. A key fob may be provided with a separate button for deployment of the storage assembly, or a combination of existing buttons, holding down a button for a predetermined time, or predetermined button operation sequence used to deploy or retract the storage assembly. In some embodiments, the storage assembly 10 may retract into a compartment (see the dotted lines 90 of FIG. 1) within the tailgate 12.

The above-describe storage assemblies 10, in a closed tailgate configuration, partition storage space within the bed of the vehicle by providing individual containment areas and, in an open tailgate configuration, provide vertical shelving for placement of loose items. While only one shelf member 34 is described above, there may be multiple shelving members, for example, disposed at multiple spaced-apart locations. Additionally, while a pick-up truck is illustrated above, other types of vehicles may include the storage assemblies 10. For example, some SUVs and other vehicle types may include a tailgate configured to move between open and closed positions.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle rear end assembly comprising:
    a tailgate having a folded-down open position for providing access to a rear storage space of a vehicle through an access opening and a folded-up closed position for closing the access opening; and
    a storage assembly connected to the tailgate, the storage assembly including a shelf member, wherein when the storage assembly is in a deployed configuration, the shelf member is supported vertically above the tailgate with the tailgate in the open position;
    wherein the shelf member, in the deployed configuration, forms a vertical wall of a storage compartment within the rear storage space of the vehicle with the tailgate in the closed position;
    wherein a floor of the rear storage space provides an exposed bottom to the storage compartment within the rear storage space of the vehicle with the tailgate in the closed position.

2. The vehicle rear end assembly of claim 1, wherein the shelf member, in a retracted configuration, is moved toward the tailgate.

3. The vehicle rear end assembly of claim 1, wherein the storage assembly is connected to the tailgate such that the storage assembly moves with the tailgate between open and closed positions.

4. The vehicle rear end assembly of claim 3, wherein the storage assembly includes the shelf member and a support member that supports the shelf member spaced-apart from the tailgate with the storage assembly in the deployed configuration.

5. The vehicle rear end assembly of claim 4, wherein the support member forms a second vertical wall of the storage compartment within the rear storage space of the vehicle with the tailgate in the closed configuration.

6. The vehicle rear end assembly of claim 4, wherein the support member folds toward the tailgate in a retracted configuration.

7. The vehicle rear end assembly of claim 3, wherein the storage assembly is located outside the storage space with the tailgate in the open position, the storage assembly located inside the storage space with the tailgate in the closed position.

8. A vehicle storage assembly of a vehicle comprising:
    a deployable and retractable shelf member connected to a tailgate of the vehicle, the shelf member comprising a front facing edge, a rear facing edge and ends that extend between the front facing edge and the rear facing edge; and a support member that supports the shelf member spaced from the tailgate with the storage assembly in the deployed configuration, the support member forming a partition located between the ends of the shelf member with the storage assembly in the deployed configuration;

wherein, in a deployed configuration, the shelf member is supported spaced-above the tailgate to provide a horizontal support surface with the tailgate in an open position and the shelf member is supported spaced horizontally from the tailgate to provide a sidewall of a storage compartment with the tailgate in a closed position;

wherein the support member retracts toward the tailgate to place the shelf member in an intermediate configuration with the support member located between the shelf member and the tailgate.

9. The vehicle storage assembly of claim 8, wherein the shelf member, in a retracted configuration, is moved toward the tailgate.

10. The vehicle storage assembly of claim 8, wherein the storage assembly is connected to the tailgate such that the storage assembly moves with the tailgate between the open and closed positions.

11. The vehicle storage assembly of claim 10, wherein the shelf member, in the deployed configuration, forms the sidewall of the storage compartment within a rear storage space of the vehicle with the tailgate in the closed position.

12. The vehicle storage assembly of claim 11, wherein the support member forms a second sidewall of the storage compartment within the rear storage space of the vehicle with the tailgate in the closed configuration.

13. The vehicle storage assembly of claim 12, wherein a floor of the rear storage space provides an exposed bottom to the storage compartment within the rear storage space of the vehicle with the tailgate in the closed configuration.

14. The vehicle storage assembly of claim 11, wherein the storage assembly is located outside the storage space with the tailgate in the open position, the storage assembly located inside the storage space with the tailgate in the closed position.

15. A vehicle comprising:

a rear storage space;

a tailgate providing access to the rear storage space, the tailgate having an open position and a closed position; and a storage assembly connected to the tailgate, the storage assembly including a shelf member, wherein when the storage assembly is in a deployed configuration, the shelf member is supported vertically above the tailgate with the tailgate in the open position;

wherein the shelf member, in the deployed configuration, forms a vertical wall of a storage compartment within the rear storage space of the vehicle with the tailgate in the closed position;

wherein a floor of the rear storage space provides an exposed bottom to the storage compartment within the rear storage space of the vehicle with the tailgate in the closed configuration.

16. The vehicle of claim 15, wherein the shelf member rotates with the tailgate between the open and closed positions.

* * * * *